US006330645B1

(12) United States Patent
Harriman

(10) Patent No.: US 6,330,645 B1
(45) Date of Patent: Dec. 11, 2001

(54) MULTI-STREAM COHERENT MEMORY CONTROLLER APPARATUS AND METHOD

(75) Inventor: Guy Harriman, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/217,139

(22) Filed: Dec. 21, 1998

(51) Int. Cl.[7] .................................................. G06F 12/00
(52) U.S. Cl. ............................................. 711/151; 711/147
(58) Field of Search ..................................... 711/149, 150, 711/151, 158, 168, 173, 120, 114, 113, 154, 147, 148; 710/6, 36, 113, 240, 241

(56) References Cited

U.S. PATENT DOCUMENTS

| | | | |
|---|---|---|---|
| 4,797,850 | 1/1989 | Amitai | 364/900 |
| 5,313,624 | 5/1994 | Harriman et al. | 395/575 |
| 5,504,882 | 4/1996 | Chai et al. | 395/182.03 |
| 5,774,684 | 6/1998 | Haines et al. | 395/309 |
| 5,781,799 | 7/1998 | Leger et al. | 395/842 |
| 5,790,839 | 8/1998 | Luk et al. | 395/556 |
| 6,065,077 | * 5/2000 | Fu | 710/100 |

OTHER PUBLICATIONS

Leigh, Bertrand, Using CPLD Memory Controllers to Boost Efficiency, isd Home, http://www.asic.com/ic-logic/DRAM/DR.html Date N/A.

Bagnoli, Carlo and Angelo Casamatta, Groupe Bull Chipsets for PowerPC Multiprocessor Architectures, http://www-.chips.ibm.com/techlib/micronews/vol3 no2/bull f.htm Date N/A.

* cited by examiner

*Primary Examiner*—Do Hyun Yoo
*Assistant Examiner*—Yamir Encarnación
(74) *Attorney, Agent, or Firm*—Edward A. Becker

(57) ABSTRACT

Multiple memory access streams issued by multiple memory controller access devices are used for accessing DRAM or other memory. The memory controller can arbitrate among requests for multiple requestors, such as in a multiprocessor environment. Coherency can be provided by snooping a write buffer and returning, write buffer contents directly, in response to a read request for a matching address. Coherency need not be implemented through the entirety of an address space and preferably can be enabled for only selected portion or portions of the address space, reducing unnecessary coherency checking overhead.

29 Claims, 5 Drawing Sheets

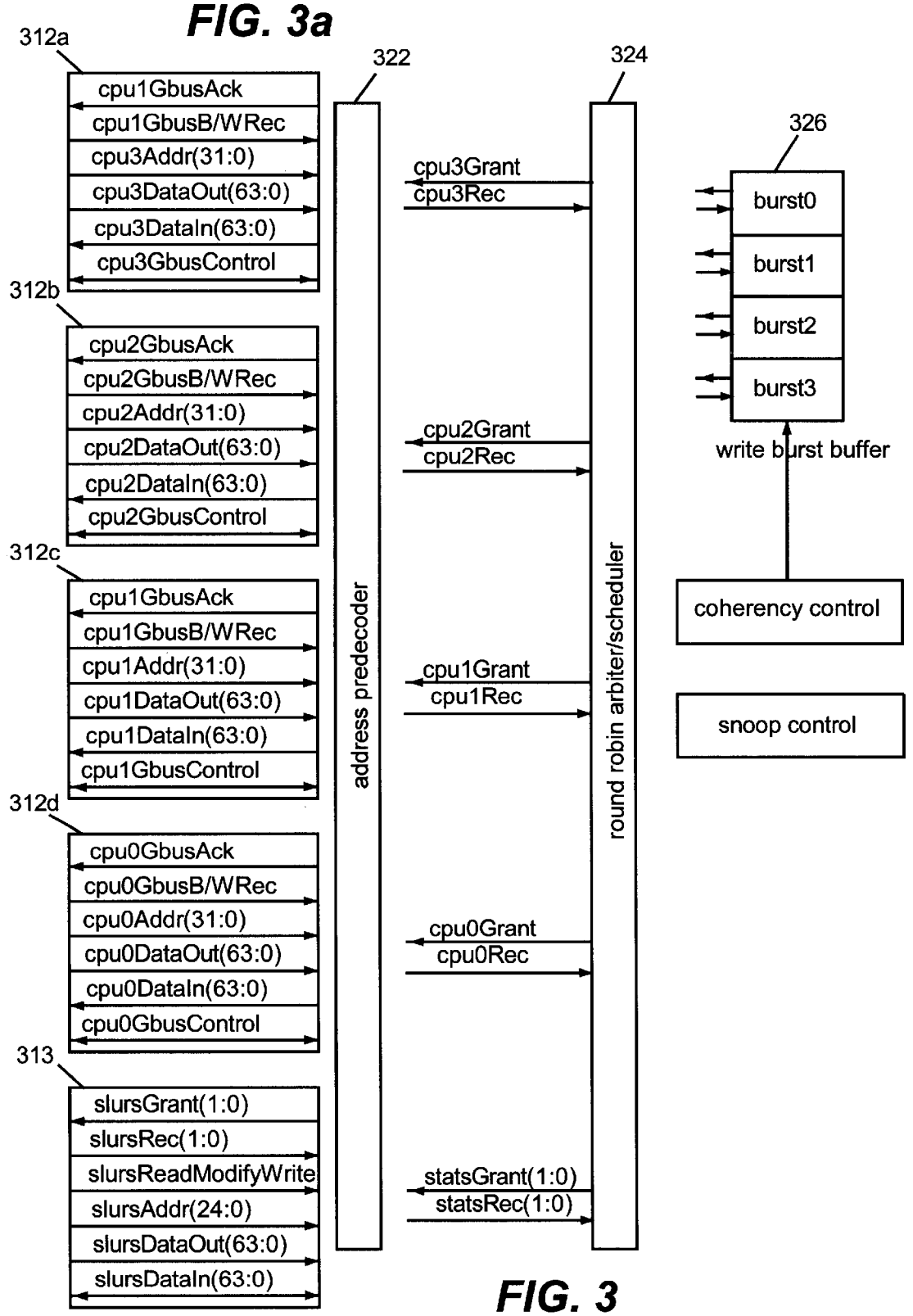

MULTI-STREAM COHERENT MEMORY CONTROLLER APPARATUS AND METHOD

The present invention relates to memory controllers and in particular to a system with two or more memory controllers providing multiple memory streams to reduce external memory bottleneck problems.

BACKGROUND INFORMATION

Many previous computers or computer systems employ a memory controller (MC) principally for receiving requests for memory and outputting signals, such as address, row address strobe (RAS) read/write (R/W) and similar signals, for controlling a dynamic random access memory (DRAM) or similar memory to read from or write to the memory. In many such systems, there is, effectively, a single memory requester, such as the microprocessor, to which the memory controller responds.

Among many aspects which affect system performance is the effective bandwidth available for communicating between system components. In a typical previous system, the requester and memory controller (as well as the memory itself) were provided as different components (on separate "chips") and communicated via one or more buses. Accordingly, the effective bandwidth available for sending requests from a requester to the memory controller and sending control or other signals from the memory controller to the memory represented potential limitations on overall system performance. In relatively older and slower systems, the requester/memory-controller/memory bandwidth has not typically been the limiting factor on system performance. However, as performance for even moderately-priced computer systems has risen to include systems with clock speeds exceeding, e.g. 100 or 200 megahertz, the requester/memory-controller/memory bandwidth has, more frequently, become of concern. Accordingly it would be useful to provide a configuration which effectively increases the bandwidth of the communications between the requester and the memory controller and/or between the memory controller and memory.

Recently, circuit integration has improved to the point that sufficient gate density is available to integrate multiple components on one integrated circuit (IC) or "chip" providing a so-called "system on a chip". Such system level integration (SLI) avoids at least some bus bandwidth issues, but increases the significance of bandwidth issues for remaining buses, including for example, memory controller/memory bandwidth issues. Accordingly, it would be useful to provide a system which takes advantage of the opportunities presented by high gate-density SLI systems, preferably in such a way as to address memory controller/memory bandwidth issues.

Although a certain linear increase in bandwidth can be achieved by increasing bus width (particularly in light of the increased pin count contemplated for "system on chip" devices), a mere increase in bus width, by itself, provides only limited increases in bandwidth and may be insufficient to keep up with bandwidth increases in other parts of the system, such as arise from the use of SLI techniques. Accordingly it would be useful to provide a system which achieves an effective increase in, for example, memory-controller/memory bandwidth, which takes advantage of and exceeds bandwidth increases available from increases in bus width.

Some previous computer systems have involved the use of more than one memory requester. One example is a multiprocessor system in which two or more processors (and/or other devices) may each generate memory requests. In at least some previous multiprocessor systems, all requests from the various memory requesters were directed to a single main memory array, and a memory controller would output a single memory stream to the main memory array. It is believed that outputting of multiple memory streams, e.g. in response to multiple requesters, has not been previously achieved, perhaps because of the degree of complexity involved which can make implementation infeasible, particularly when a memory controller is on a separate integrated circuit (such that requester/memory-controller communications are performed via a bus). Accordingly, it would useful to provide a way of reducing external memory bottleneck by providing multiple memory streams in a substantially parallel fashion, preferably without introducing an unacceptable level of complexity.

Multiple requester systems can also introduce data coherency issues. For example if one CPU is reading data from a given memory location at about the same time that another CPU is attempting to write data to that location, there is concern whether the first CPU will receive the most recent or valid data. There is, however, a performance "cost" in providing such coherency which typically applies to the entire memory system. Accordingly, it would be useful to provide a multi-stream memory system which can provide needed coherency while reducing the average performance cost of the coherency scheme, compared to certain previous coherency schemes.

Some coherency schemes involve delaying a read request if there is a pending write for the same data, until after the write is complete. While it is clear that such a scheme can achieve or contribute to coherency, the scheme will increase delay or latency in the system, in at least some situations. Accordingly, it would be useful to provide a multi-stream coherent memory system which can reduce or eliminate delay or latency as compared to the delay or latency imposed by previous coherency systems.

SUMMARY OF THE INVENTION

In the present invention, multiple memory controllers are provided, preferably with an arbiter capable of selecting two or more of the requesters at a time. In one embodiment, the multiple memory controllers are provided as part of a system on a chip having two or more CPU's (or other requesters) as well as multiple memory controllers (and other components) on a single chip.

Coherency of memory with multiple controllers preferably involves a system in which the same data is written to the address space of each memory controller so that the same data can be read from each memory stream. To provide the type of coherency desirable in connection with multiple memory streams, the memory can be made fully coherent. In one embodiment, however, coherency is configurable. It may be, for example, that, in at least a portion of the memory, coherency is not required. For example, if a first portion of memory can be addressed by a first requester (for a given application) but will not be addressed (or at least will not be written-to) by other requesters, there is no need for coherency of that portion of memory. According to one embodiment of the invention, it is possible to configure the system to provide coherency or to improve performance by turning off coherency. Preferably coherency may be selected on or off for only portions of memory, such as with respect to all or portions of the memory addressed (or written-to) by a given memory controller. In this way, the system can be configured to provide the coherency that is needed while reducing the average latency imposed by such coherency.

In one embodiment, further latency reduction can be provided by using the memory controller to monitor or "snoop" the write buffer. The snooped write buffer can then immediately return data if a read request is made for an address which is about to be written-to (instead of delaying the read until the data in the write buffer is written to memory).

DETAILED DESCRIPTION OF THE PREFERRED EMBODIMENTS

Figure 1:
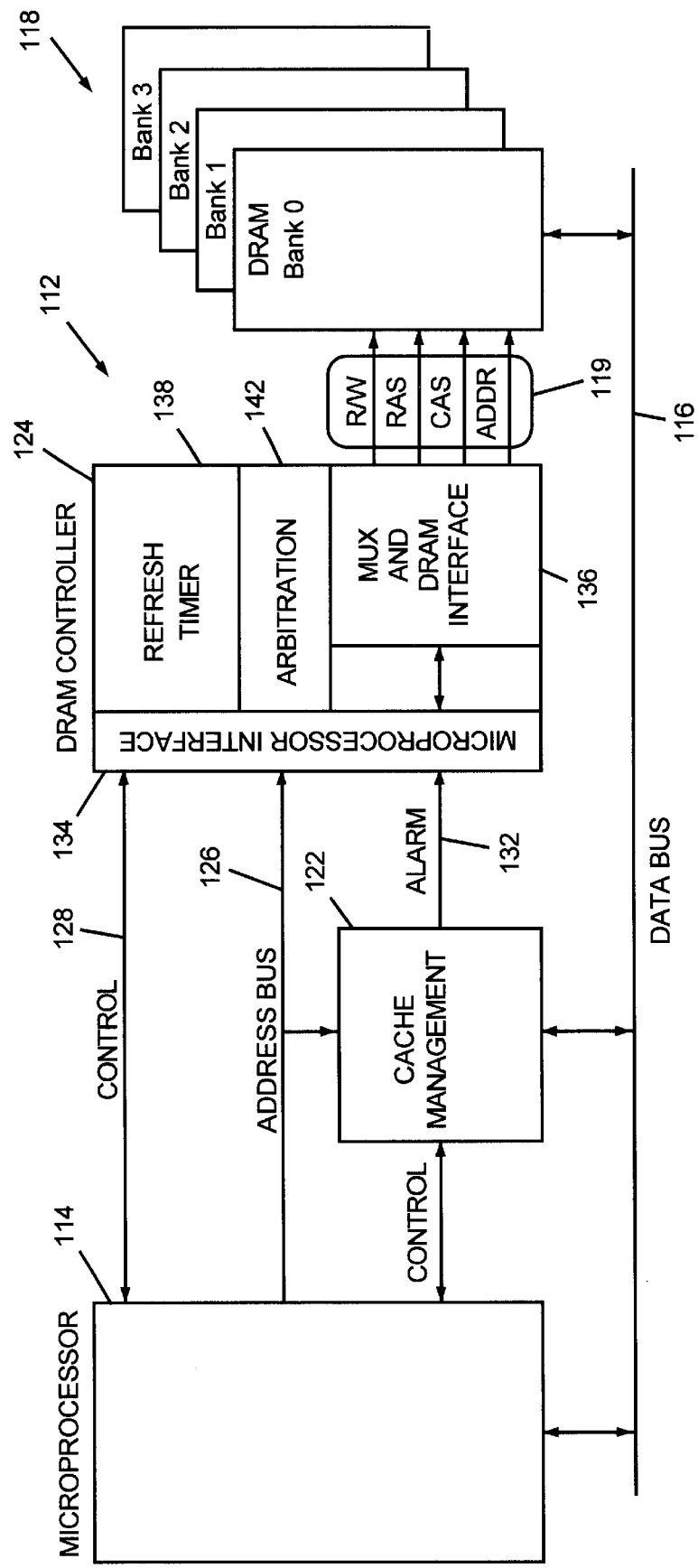
FIG. 1 is a block diagram of a portion of a previous computer system including a memory controller for DRAM memory.

Before describing features of the present invention, certain aspects of previously provided systems will be described. As shown in FIG. 1, a portion of a computer system 112 includes a microprocessor 114 connected by a data bus 116 to dynamic random access memory (DRAM) 118 and cache management circuitry 122. A memory controller 124 receives address signals 126 and control signals 128, 132 from the microprocessor 114 and/or cache management 122 and outputs, to the DRAM 118 control signals such as address, cache match, RAS and R/W. In the configuration depicted in FIG. 1, a microprocessor/cache interface 134 receives the control and address signals and begins the logic for a memory access. The multiplexer and DRAM interface 136 translates or decodes the address and other information into row and column addresses and strobe signals and the like. A refresh timer 138 issues refresh requests at appropriate times to assure data integrity of the DRAM. Arbitration logic 142 determines what action to take if there is an access request at about the same time as a refresh request. This type of arbitration is typically relatively simple such as providing the refresh request with highest priority unless a refresh cycle is requested during a memory access (in which case memory is refreshed upon completion of access).

Figure 2:
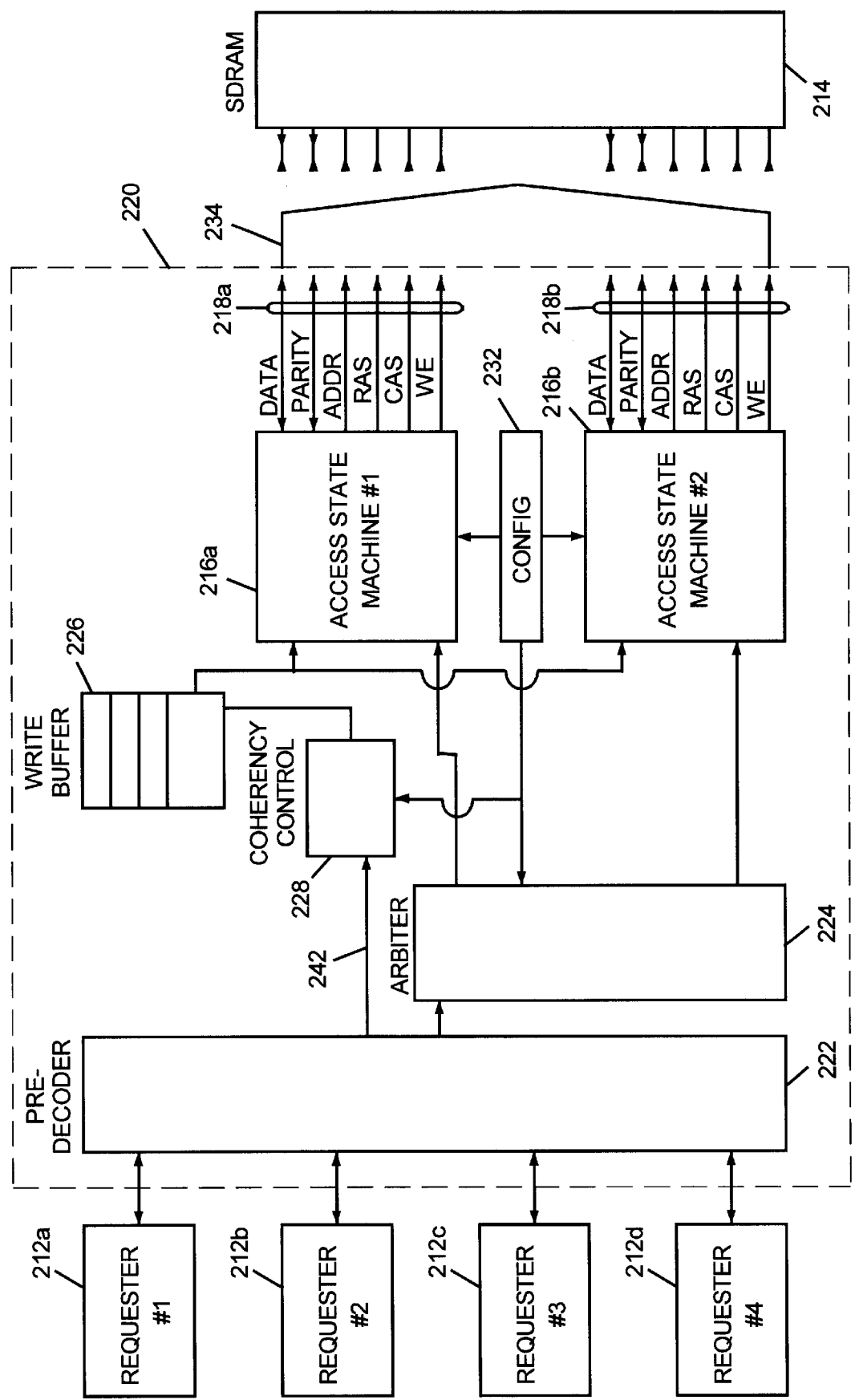
FIG. 2 is a block diagram showing memory controllers coupled to multiple requesters for controlling a memory, according to an embodiment of the present invention.

FIG. 2 is a block diagram depicting a system according to one embodiment of the present invention. In the system of FIG. 2, multiple requesters, in this case, four requesters 212a, b, c, d, output requests for data stored in a synchronous dynamic random access memory (SDRAM) 214. Multiple access state machines (in this case, two access state machines 216a, 216b output first and second memory control streams 218a and 218b. Each of the streams 218a, 218b is similar in nature to the (single) memory control stream 119 output by previous memory controllers and, in this sense, the system effectively provides multiple memory controllers or multi-stream memory control. The multi-stream memory controller 220 also includes, in the depicted embodiment, a predecoder 222, an arbiter 224, a write buffer 226, coherency control 228 and configuration registers 232. In one embodiment, the memory controller unit 220 is formed on the same chip as one, or preferably all, of the requestors 212a, b, c, d such as being part of a "system on chip". Although many different types and levels of integration can be used in connection with features of the present invention, it is anticipated that typically the SDRAM 214 will be on a separate chip and will communicate with at least the memory control unit 220 via one or more buses 234.

As will be described more fully below, to take advantage of certain features provided in the present invention, it is useful to obtain information regarding a request prior to the time that such request is handled by the access state machines 216a, b and, accordingly, requests which are output by the requesters 212a, b, c, d are received by a predecoder 222. At least some of the information obtained by the predecoder 222 is passed to the arbiter 224. The arbiter 224 is able to determine the order in which memory access requests are granted. This can be particularly useful when some devices are substantially slower than others. Typically, in previous devices, memory requests were granted in the order presented. A request for a large block of memory presented by a relatively slow device could create a so-called "head-of-line" blocking problem in which requests from relatively fast devices are held-up for a relatively long period of time while requests from a slow device are being handled. Preferably, the arbiter 224 of the present invention is configured to at least provide equal access to different requesters, e.g. using a "round robin" scheme. The arbiter can also be configured to provide other schemes such as a combination of strict priority (certain requesters always having precedence over others) and round robin schemes (such as providing high-priority round robin allocation to certain requesters and low priority to all others), and like. In one embodiment, the arbiter is programmer-configurable e.g. such that a programmer may select among a plurality of different arbitration schemes as may be suitable for a particular application.

In one embodiment, the arbiter receives and uses information regarding requests from all the various requesters and uses this information in determining the order in which to grant requests. Thus, unlike many previous arbiters, the arbiter of the present invention preferably has, at any one time, information regarding requests from a plurality of different requesters (as opposed to simply the next to request). Furthermore, certain arbitration schemes make it useful to have information regarding a plurality of upcoming requests from some or all of the requesters. For example, the arbiter could be provided with one or more thresholds such that the priority of requests from a slow device is lowered if the slow device is requesting a relatively large amount of data. Such information regarding upcoming requests is one of the items which may be provided to the arbiter 224 by the predecoder 222.

When the memory access request is a request to perform a write to memory, data from the write request may be placed in a write buffer 226 e.g. for storage until such time as the arbiter is prepared to grant the write request. In situations where a read request is made for data in the memory location for which a write request is currently pending (in the write buffer), it is generally desirable to assure that the data returned in response to such read request reflects the data which is in the write request (in this example, currently residing in the write buffer) rather than returning "stale" or invalid data (in the current state of the DRAM). Coherency issues also arise in previous memory systems which include memory caching and one solution, in cache systems, has been to check all new read requests against the addresses of pending write requests and, and in case of a match, delay granting the read request until the write request has been completed. Although it is possible to implement an embodiment of the present invention using this type of delay technique, it is preferred to configure a coherency control 228 such that, if a match is detected between a read request address and a pending write request address, rather than delay granting read request, the read request is immediately granted, by returning data directly from the appropriate data in the write buffer 226. Preferably, if a subsequent write request for the same write request address is received while the first write request is still pending (i.e. while the data from the first write request is still in the write buffer), the data in the subsequent write request will overwrite the data, for the same address, pending in the write buffer. Such snooping of the write buffer 226 by coherency control 228 can be configured to precede handling of the read request by the access state machine 216a, b or even the arbiter 224 e.g. by providing 242 information regarding upcoming read requests from the predecoder 222 to the coherency control 228.

In order for coherency to be maintained in this fashion, the arbiter 224 must delay granting read requests until after coherency control has determined that there is no pending write for that address, in the absence of a write buffer. Additionally, writes must be made by each access state machine 216, using up memory bandwidth. This loss of bandwidth imposes a performance cost or overhead on coherency checking. Although it is possible, according to embodiments of the present invention to configure the system such that coherency is enforced (and the coherency overhead is borne) across the entire address space controlled by the memory controller, there are some situations in which it is known (or presumed) ahead of time that coherency issues will not arise. Typically, it is possible to define a certain portion of the address space in which coherency issues will not arise (e.g. there may be a portion of memory which, for a particular application, will be written—to only once and, thereafter, only read) and/or to define a portion of the address space which will never have coherency problems with respect to another portion of the address space (e.g. the portion used for storing instructions versus the portion used for storing data). It may be possible to define portions of memory which do not give rise to coherency problems with respect to different memory requesters (e.g. when first and second different requesters each exclusively use first and second disjoint portions of the memory space). In such situations, reducing the available memory bandwidth through writing to each SDRAM space for coherency to be enforced represents unnecessary delay for those portions of memory. According to one embodiment of the present invention, the system can be configured such that coherency checking is performed (and coherency enforcing overhead is borne) only for a portion of the address space and no coherency checking is performed on at least another portion of the address space. Although there may be some situations in which the address spaces which can be exempt from coherency checking are defined by software (e.g. using software to automatically define (without the need for human decisions) the instruction address space versus the data address space), it is anticipated that many situations in which coherency checking can be dispensed with will be specific to particular applications, and the appropriate address space for turning on or off coherency will be defined by a programmer. Preferably, applications will be written in such a manner that certain bits of the address (such as a predefined number of most significant bits or least significant bits of the address) can be used for defining portions of the address space where coherency checking will be enabled or disabled. In situations where the issue of whether coherency is needed is partially dependent on which requester issued the request, there may be separate definitions of which address space portions are exempt from coherency checking specific to each requester.

In one embodiment, the programmer may configure the address spaces for which coherency checking is to be performed and/or configure the type of arbitration to be performed (or other configurable items) by storing data into registers of a configuration register set 232.

When the arbiter 24 has determined that an access may be granted, the access state machines 216a, b, in response to control from the arbiter 224, outputs control signals 218a, 218b, from each state machine 216a, b.

Figure 3B:
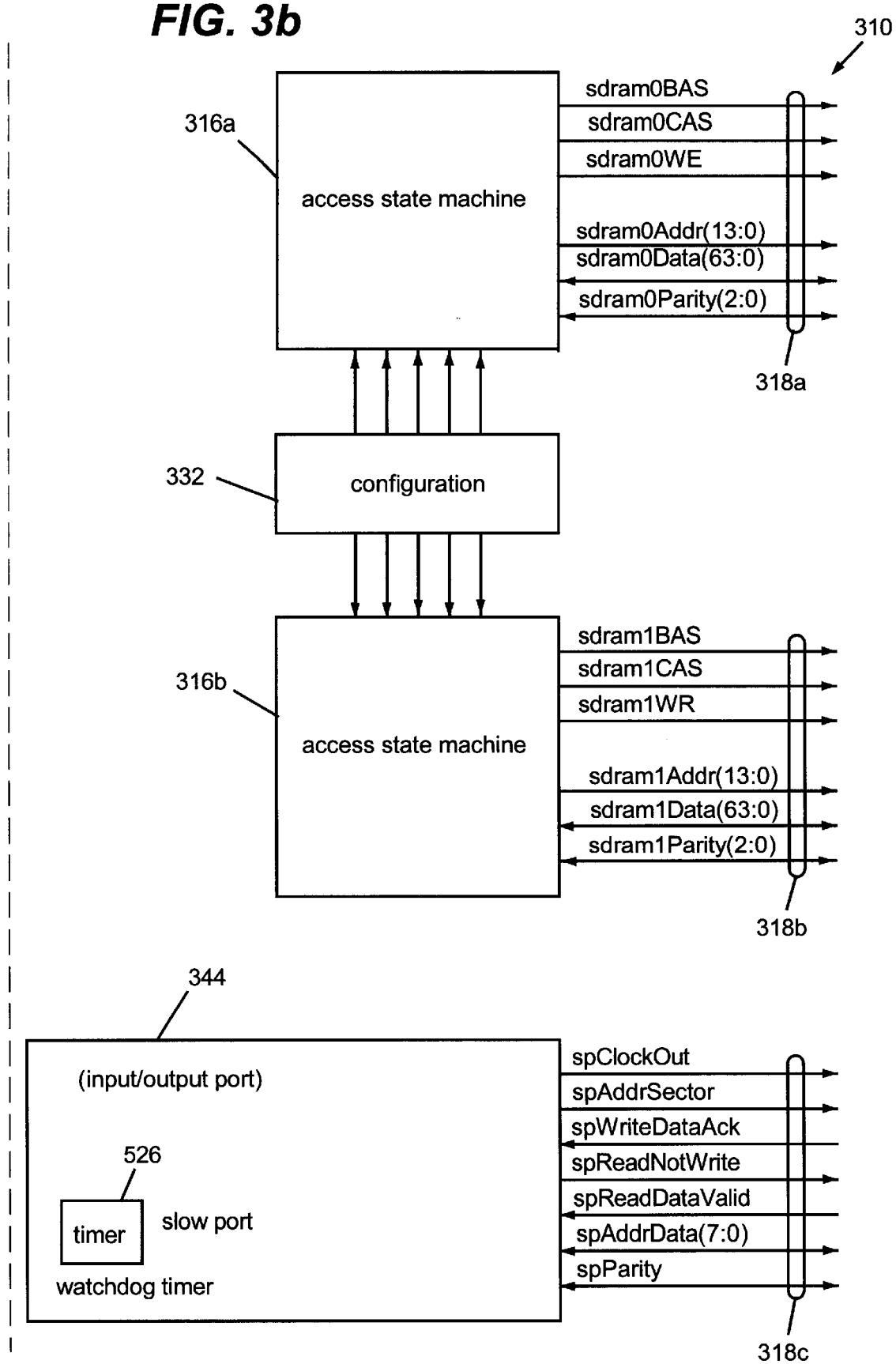
FIG. 3 is a block diagram depicting a multi-stream memory controller system according to an embodiment of the present invention.
Figure 4:
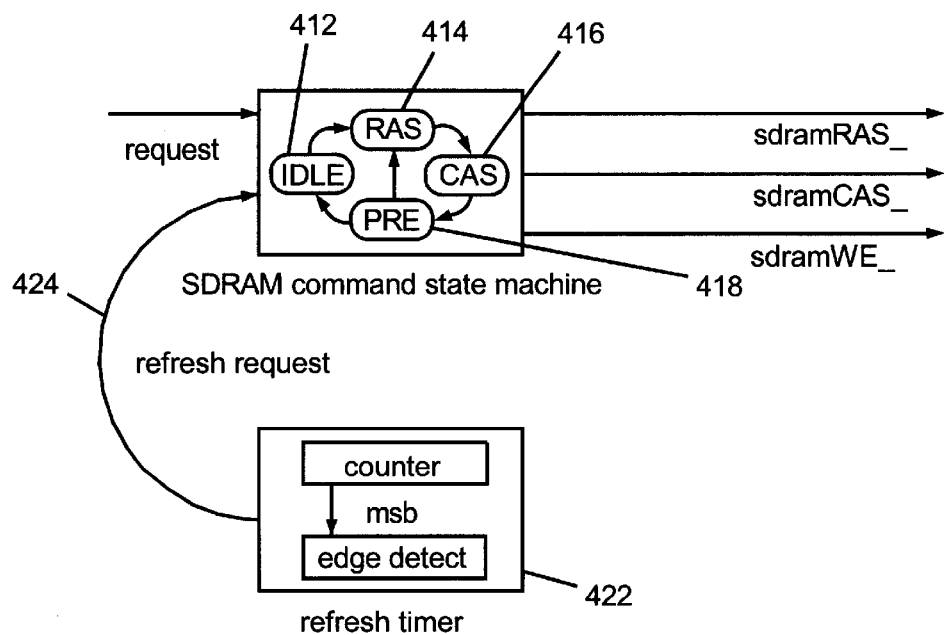
FIG. 4 is a state diagram depicting an access state machine for accessing SDRAM according to an embodiment of the present invention.
Figure 5:
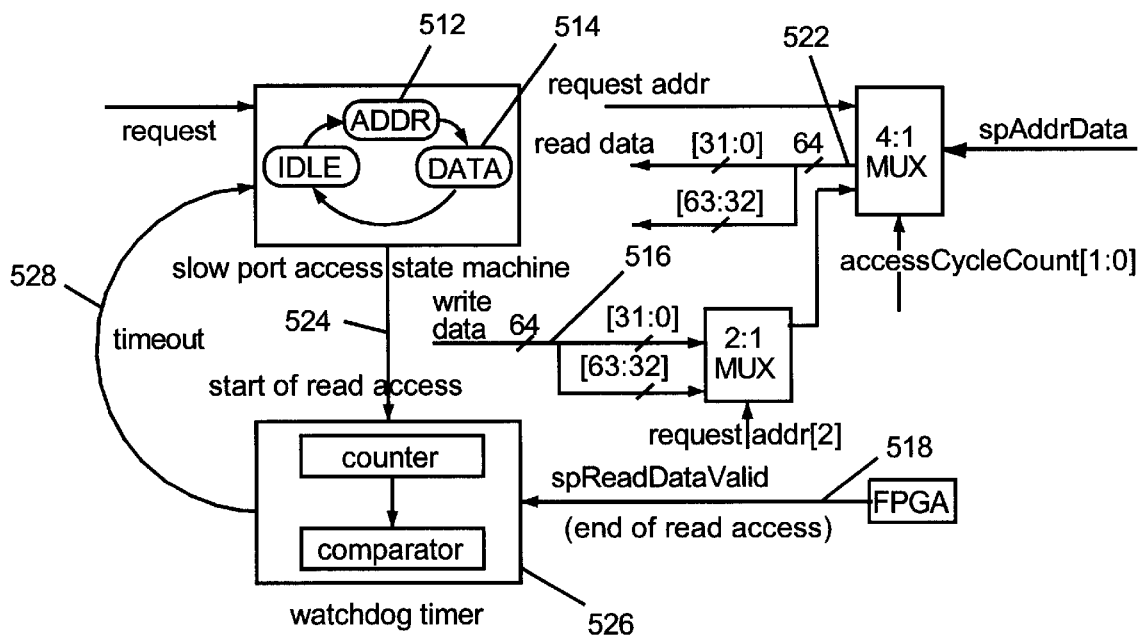
FIG. 5 is a state diagram depicting an access state machine according to an embodiment of the present invention.

FIGS. 3 through 5 illustrate in greater detail, a memory controller in accordance with features of the present invention. The meaning of certain internal and external signals shown in FIG. 3. are summarized in Tables I and II. In the embodiment of FIG. 3, four CPU's of a multi-processor system may provide requests 312a, b, c, d for SDRAM memory. Status requests 313 are also supported. A slow system I/O port 344 ("slow port") represents a fifth client. The controller of FIG. 3 manages 32-byte burst accesses to external SDRAM for the five on-chip clients. The controller 310 may select two independent read streams 318a, 318b with a fully coherent write buffer 326 (in which the memory space holds the same data) or independent memory spaces (in which each memory space holds different data). An arbiter 324 using information obtained from the address predecoder 322 provides round robin arbitration and read write scheduling between clients. The CPU system provides wide point-to-point data connection to SDRAM to avoid transmission line problems on board. The use, preferably, of one SDRAM only per data bit allows a smaller (e.g. about 2 mA) data pad driver to be used. This reduces the transmission line effects, because of having a single point-to-point trace from the ASIC to the SDRAM, and reduces simultaneous switching current significantly.

TABLE I

Memory Controller External I/O Signal List

| Signal Name | # Bits | I/O | AC Load (pF) | DC drive (mA) | Description |
|---|---|---|---|---|---|
| sdram0RAS_ | 1 | O | 50 | 8 | Row Address Strobe for stream 0 |
| sdram0CAS_ | 1 | O | 50 | 8 | Column Address Strobe for stream 0 |

TABLE I-continued

Memory Controller External I/O Signal List

| Signal Name | # Bits | I/O | AC Load (pF) | DC drive (mA) | Description |
|---|---|---|---|---|---|
| sdram0WE | 1 | O | 50 | 8 | Write Enable for stream 0 |
| sdram0Addr | 14 | O | 50 | 8 | Row and Column address for stream 0 |
| sdram0Data | 64 | I/O | 20 | 2 | Data bus for stream 0 - Single load per bit only |
| sdram0Parity | 8 | I/O | 20 | 2 | Data bus odd parity for stream 0-Single load per bit only |
| sdram1RAS | 1 | O | 50 | 8 | Row Address Strobe for stream 1 |
| sdram1CAS_ | 1 | O | 50 | 8 | Column Address Strobe for stream 1 |
| sdram1WE___ | 1 | O | 50 | 8 | Write Enable for stream 1 |
| sdram1Addr | 14 | O | 50 | 8 | Row and Column address for stream 1 |
| sdram1Data | 64 | I/O | 20 | 2 | Data bus for stream 1-single load per bit only |
| sdram1Parity | 8 | I/O | 20 | 2 | Data bus odd parity for stream 1-Single load per bit only |
| spClockOut | 1 | O | 40 | 2 | Slow Port 50 MHz Clock |
| spAddStrobe | 1 | O | 40 | 2 | Slow Port Address Strobe-asserted with valid address |
| spReadNotWrite | 1 | O | 40 | 2 | Slow Port Read/Write flag |
| spReadDataValid | 1 | I | 40 | — | sdram0RAS_ |
| spWriteDataAck | 1 | I | 40 | 2 | Slow Port Write data taken flag; asserted if data is accepted |
| spAddrData | 8 | I/O | 40 | 2 | Slow Port multiplexed Address and Data bus |
| spParity | 1 | I/O | 40 | 2 | Slow Port multiplexed Address and Data bus odd Parity |

TABLE II

Memory Controller Internal I/O Signal List

| Signal Name | # Bits | I/O | Description |
|---|---|---|---|
| cpu0GbusStart_ | 1 | I | Asserted during first cycle of access (active low) |
| cpu0GbusAddress | 32 | I | CPU address (32 lsbs of 36 bit Gbus address) |
| cpu0GbusEnable | 8 | 1 | Byte enables for 8 bytes of data read or written |
| cpu0GbusRead_ | 1 | I | Gbus read request |
| cpu0GbusWrite_ | 1 | I | Gbus write request |
| cpuoGbusAck_ | 1 | O | Gbus read/write acknowledge-valid data or bus |
| cpu0GbusReadBusError_ | 1 | O | Gbus read bus error - invalid read data |
| cpu0GbusRead_ | 1 | I | Gbus read request |
| cpu0GbusRead_ | 1 | I | Gbus read request |
| cpuoGbusRead_ | 1 | 1 | Gbus read request |
| sdram1CAS_ | 1 | O | Column Address Strobe for stream 1 |
| sdram1WE_ | 1 | O | write Enable for stream 1 |
| sdram1Addr | 14 | O | Row and Column address for stream 1 |
| sdram1Data | 64 | 1/O | Data bus for stream 1-Single load per bit only |
| spClockOut | 1 | O | Slow Port 50 MHz Clock |
| spAddrStrobe | 1 | O | Slow Port Address Strobe-asserted with valid address |
| spReadNotWrite | 1 | O | Slow Port read/Write flag |
| SpReadDataValid | 1 | I | Slow Port Read Data Valid flag; asserted when data is valid |
| spWriteDataAck | 1 | O | Slow Port Write Data Valid flag; asserted as data is output |
| spAddrData | 8 | I/O | Slow Port multipiexed Address and Data bus |

The Memory Controller 310 preferably supports two types of DRAM accesses: conventional DRAM, and enhanced SDRAM (differing principally in the number of clock cycles for RAS, CAS, and precharge). The depicted memory system always access 32 bytes per burst, as four column address strobe (CAS) clock cycles of 8 bytes each. Bursts are always in four clock cycles with no gaps. The latency for the first CAS to data out preferably can be selected. However the access state machine 216a, b can be designed to accommodate other burst sizes or memory widths.

Flexibility is given in configuring how the two memory controllers or state machines work together. If minimum read latency is most important, then the two memory spaces can be made fully coherent. This means every write to memory happens in both memory spaces, so that either can be read by a requester, imposing a loss of overall memory bandwidth. The snooped write buffer 326 immediately returns data if a read is made to an address which is about to be written to, instead of holding up the read until the data in the write buffer is written to memory. If a read access is made to a memory stream which is not enabled, then a ReadBusError is returned by the Memory Controller 310. Similarly, if a write access is made to a memory stream which is not enabled, then a bus exception interrupt is raised by the Memory Controller 310.

If coherent memory is not required, then the two access state machines 316a, b are mapped to different address spaces. One example would be that data is held in one address space, and code is held in the other address space. A difference in behavior between the two modes is that writes are dispatched to both memory controllers (or state machine) in the coherent mode, but writes only are sent to the appropriate address space in the non-coherent mode.

The address predecoder 322, among other functions, ensures that only accesses which are destined for the memory controller are seen by the memory controller arbiter 324. The only timeout needed in the memory controller is for the slow system I/O port 344 which can access devices with unknown behavior.

The arbiter and scheduler can deliver up to three grants at once 318a, b, c. The release or end-of-access signal from the memory controllers are not synchronized together. Memory accesses can start and complete at any time. The arbiter takes into account the occupancy of the write buffer and the pending requests when determining which accesses to schedule, and which grants to make.

The memory map supports the two DRAM streams, the slow system I/O port, and configuration. In the depicted embodiment, the DRAM memory streams can address up to two gigabytes of SDRAM, using 14 RAS and 14 CAS address bits (total 28 address bits), and each access providing 6 bits (8 bytes), if both streams are operating in the coherent mode. If the streams are operating as separate address spaces, SDRAM memory stream 0 318a can address up to two gigabytes of SDRAM, using 14 RAS and 14 CAS address bits (total 28 address bits), while SDRAM memory stream 1 316b can address up to one gigabyte of SDRAM, using 13 RAS and 14 CAS address bits (total 27 address bits) in this example. The number of address bits can be extended as required by the application.

Preferably, the SDRAM memory spaces do not overlap. In order to support up to three (gigabytes of external physical memory, 14 RAS/CAS address bits are output. Each SDRAM data bus is 64 bits wide, corresponding to byteAddress[2:0]. Therefore, the 14 RAS/CAS address bits correspond to byteAddress[30:3], covering a memory space range of 0x80000000. Each access state machine 316a, 316b performs SDRAM access for one stream in the memory map.

The Controller asserts sdramRAS_, sdramCAS_, and sdramWE_, as well as multiplexing the RAS and CAS addresses, and driving write data onto the sdramData[63:0] bus, and sampling read data from the sdramData[63:0] bus.

As illustrated in FIG. 4, the four states in the SDRAM state machine are:

IDLE 412

RAS 414—assert sdramRAS_ to activate the SDRAM access

CAS 416—assert sdramCAS_ to initiate the CAS access waiting for CAS latency before transferring data PRE 418—issue precharge command to SDRAM, while burst transaction is in progress Each SDRAM word line (row) must be refreshed e.g. every 64 msec. Preferably, CAS before RAS refresh access is used. A refresh timer 422 issues a refresh request 424 to both streams (if enabled) every 4 μsec, to accommodate up to 16 k rows. In 16 Mb and 64 Mb SDRAMs, multiple banks are used to keep the number of rows low; typically around 2048. Therefore, performing a refresh access every 4 μsec provides headroom without compromising bandwidth to the SDRAM. Assuming 8 cycles per access, refresh consumes 8 cycles out of 400 at 100 MHz, or 0.5% of bandwidth. It is also possible to use SDRAM technologies such as hidden refresh to eliminate this loss of bandwidth if desired.

Typically, SDRAM addresses have one or more bank address bits. The depicted memory controller uses sdramAddr[0] as the bank bit, and this bit determines the active bank on the SDRAMs.

The purpose of multiple banks within the SDRAM is to permit one bank to be precharged while the other bank is being accessed. Additionally, the memory controller can reorder accesses based on the value of the bank bit to optimize the bidding of the precharge delay. The more often the bank bit toggles, the higher the performance of the memory system.

The memory controller issues a precharge command, by asserting RAS_low, CAS_high, and WE_low, with the opposite bank selected to the currently active bank. The memory controller must detect that the access following the active access is to the opposite bank before issuing command after the active command CAS command.

The arbiter 324 maintains fairness between the memory controller clients 312a–d, 344. The four CPU requests and, in one embodiment a standard priority Statistics Engine request (seReq[0] have an unweighted round robin to select between them. CPU0 is reset as the master of the round robin arbiter, to ensure that there is always one arbiter master.

The arbiter selects up to three requesters at a time, to allow all three memory resources (two streams 318a, b and the slow system I/O port 318c) to be filled. The address predecoder 322 in the memory controller 310 determines whether a request is destined for external memory or the slow system I/O port.

The slow system I/O port 344 provides a path to standard resources, such as flash and EEPROM, which the system provides. The slow system I/O port is, in one example, one byte wide, multiplexed address and data, in order to minimize pin usage. It is used to isolate slow devices electrically from the high speed SDRAM board traces. Dependent on system requirements, the slow system I/O port may be designed as multiplexed or non-multiplexed, e.g. if pin usage is not an issue.

As depicted in FIG. 5, the slow system I/O port access state machine first drives address 512 while asserting spAddrStrobe. The slow system I/O port then enters the data state 514. For a write, the data is immediately transmitted 516, and for a read, the state machine waits until the external field-programmable gate array (FPGA) (or ASIC), handling slow system I/O port accesses, asserts spReaddataValid 518 along with the read data 522.

At the start of each slow system I/O port read access 524, the watchdog timer 526 is started. If spReaddataValid 518 is not asserted before the timeout period is complete 528, then the read access is aborted. If a write acknowledge is not asserted before the last byte of the write data is output, then the write access is aborted.

The registers including as depicted in Table III are used to configure 322 the memory controller.

TABLE III

| CONFIGURATION BEGISTER BIT FIELDS | |
|---|---|
| Bit | Purpose of Field |
| 0 | Enable SDRAM stream 0 |
| 1 | Enable SDRAM stream 1 |
| 2 | Enable Stream Coherency |
| 3 | Enable CPU0 Grant |
| 4 | Enable CPU1 Grant |
| 5 | Enable CPU2 Grant |
| 6 | Enable CPU3 Grant |

In light of the above description, a number of advantages of the present invention can be seen. The present invention achieves high bandwidth memory access without imposing a high level of complexity. The present invention can reduce memory latency, including reducing delays associated with assuring coherency. The present invention can be configured to provide coherency for some portions of a memory address space while disabling coherency checking for other portions. The present invention takes advantage of opportunities presented by SLI techniques including taking advantage of the absence of a need for external bus connections between memory requestors and memory controllers. These external bus connections are wasteful of board space and expensive compared with internal ASIC connections.

A number of variations and modifications of the invention can be used. It is possible to use some features of the invention without using others. For example, it is possible to provide for multi-stream memory access without providing configurable coherency. Although it is anticipated that the present invention will be especially useful in system on chip and other SLI devices, it is possible to use some or all features of the present invention in other devices such as ASIC's, digital signal processors (DSPs) or embedded dedicated logic ASIC, for example for computer graphics or video compression. Although embodiments described herein have included one or more CPU's and one or more slow system I/O ports as requesters, other items can operate as requesters in the context of the present invention including dedicated logic, network address translation ASICs or graphics controllers. Although the embodiments described herein have included two, four or five requestors, other numbers of requestors, or a single requestor, can be provided in connection with at least some embodiments. Although embodiments have been described herein in which two or three memory streams are output, it is possible to configure embodiments of the present invention which output a larger number of streams (or only a single stream). Although embodiments described herein have included an SDRAM on a chip which is separate from the chip bearing the memory controllers, it is possible to provide at least some of the addressed memory on the same chip as the memory controller. Although the present invention has been described in connection with a memory controller for an SDRAM, the present invention can be used in connection with other types of memory including conventional DRAM, SRAM, SSRAM, Flash EEPROM or ferro-electric RAM (FRAM).

The present invention can be used in connection with embodiments in which the memory space for which requests are made by each requestor, are disjoint or in which they partially or fully overlap. Some requesting entities could make multiple requests simultaneously, such as data read, data write and code read.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangable and/or equivalent structures, functions, ranges or steps to those claimed, whether or not such alternate, interchangable and/or equivalent structures, functions, ranges or steps are disclosed herein, and without intending to publicly dedicate any patentable subject matter.

What is claimed:

1. A memory controller system for processing received memory requests, said received memory requests being requests within a predefined address space, comprising:

at least first and second memory controllers for outputting first and second memory request streams, each stream including an address and read/write control signals;

a predecoder which receives said memory requests and which outputs said memory requests, along with information regarding said memory requests, to an arbiter;

wherein said arbiter receives said memory requests and outputs control signals which control said first and second memory controllers such that said control signals, output by said arbiter, determine the order in which said memory requests are granted, using said information output by said predecoder, wherein the timing of said first memory request stream is independent of the timing of said second memory request stream.

2. A memory controller as claimed in claim 1 wherein said received memory requests include requests received from at least first and second different requesters.

3. A memory controller as claimed in claim 2 wherein said first and second different requesters are first and second processors of a multiprocessor system.

4. A memory controller system as claimed in claim 1 wherein said first and second memory controllers and said arbiter are part of a system-on-a-chip which contains, on a single integrated circuit, at least a processor and said first memory controller.

5. A memory controller as claimed in claim 1 further comprising a slow system I/O port state machine for outputting at least a third memory request stream.

6. A memory controller as claimed in claim 1 wherein a plurality of said received memory requests are received in a first order and wherein said arbiter controls said first and second memory controllers to provide memory requests, to a memory, in an order different from said first order.

7. A memory controller as claimed in claim 1 further comprising coherency control circuitry which provides data coherency for requests in a first portion of said address space and disables data coherency procedures for requests in a second portion of said address space.

8. A memory controller as claimed in claim 7 wherein said coherency control circuitry is configurable to select said first portion of said address space.

9. A memory controller as claimed in claim 1 further comprising coherency control configurable between at least a first state which provides coherency for all requests in said address space and a second state in which data coherency procedures are disabled in at least a portion of said address space.

10. A memory controller as claimed in claim 1 further comprising a write buffer for holding data from write requests prior to writing said data, and coherency control circuitry which causes output of data from said write buffer in response to a read request for an address matching a write address for data stored in said write buffer.

11. A system as claimed in claim 1, wherein said arbiter outputs said control signals so as to determine the order in which to grant requests in response to whether a requester is a slow device.

12. A system as claimed in claim 1, wherein said arbiter outputs said control signals so as to determine the order in which to grant requests in response to the amount of data requested.

13. A system as claimed in claim 1, wherein said arbiter outputs said control signals so as to determine the order in which to grant requests in response to occupancy of a write buffer.

14. A memory controller system for processing memory requests received from at least first and second requestors, said received memory requests being requests within a predefined address space wherein said received memory requests are received in a first order, comprising:
   at least first and second memory controllers for controlling first and second memory request streams, each stream including an address and read/write control signals;
   a predecoder which receives said memory requests and which outputs said memory requests, along with information regarding said memory requests, to an arbiter;
   wherein said arbiter receives said memory requests from said at least first and second requestors and outputs control signals which control said at least first and second memory controllers such that said control signals output by said arbiter determine the order in which said memory requests are granted, using said information output by said predecoder to control said at least first and second memory request streams, providing memory requests, to a memory, in an order different from said first order.

15. A memory controller system as claimed in claim 14 wherein said first and second requestors are first and second processors of a multiprocessor system.

16. A memory controller system as claimed in claim 14 wherein said first and second memory controllers and said arbiter are part of a system-on-a-chip which contains, on a single integrated circuit, at least a processor and said first memory controller.

17. A memory controller as claimed in claim 14 for further comprising coherency control circuitry which provides data coherency for requests in a first portion of said address space and disables data coherency procedures for requests in a second portion of said address space.

18. A memory controller as claimed in claim 14 further comprising
   a write buffer for holding data from write requests prior to writing said data, and
   coherency control circuitry which causes output of data from said write buffer in response to a read request for an address matching a write address for data stored in said write buffer.

19. A memory control method for processing received memory requests, said received memory requests being requests within a predefined address space, comprising:
   providing at least first and second state machines for outputting first and second memory request streams, each stream including an address and read/write control signals;
   providing a predecoder which receives said memory requests and which outputs said memory requests, along with information regarding said memory requests, to an arbiter;
   said arbiter outputting control signals for controlling said first and second state machines such that said control signals output by said arbiter determine the order in which said memory requests are granted, using said information output by said predecoder to output memory requests in said first memory request stream at times independent of the timing of requests in said second memory request stream.

20. A method as claimed in claim 19 wherein a plurality of said received memory requests are received in a first order and wherein requests in said first and second memory streams are provided to a memory in an order different from said first order.

21. A method as claimed in claim 19 further comprising performing coherency checking procedures for requests in a first portion of said address space in the absence of performing said coherency checking procedures for requests in a second portion of said address space.

22. A method as claimed in claim 21 further comprising receiving at least a first signal for selecting said first portion of said address space.

23. A method as claimed in claim 19 further comprising receiving at least a first signal for selecting between at least a first state which provides coherency for all requests in said address space and a second state in which data coherency procedures are disabled in at least a portion of said address space.

24. A method, as claimed in claim 19, further comprising:
   storing data from write requests in a write buffer, prior to writing said data, and
   outputting data from said write buffer in response to a read request for an address matching a write address for data stored in said write buffer.

25. A method, as claimed in claim 19, further comprising:
   storing write data from a first write request for a first address, in a write buffer; and
   overwriting said write data, in said write buffer, with write data from a subsequent write request for said first address, if said subsequent write request is received before said write data is written from said write buffer to memory.

26. Apparatus for processing received memory requests, said received memory requests being requests within a predefined address space, comprising:
   first means for outputting a first memory request stream including an address and read/write control signal;
   second means for outputting a second memory request stream including an address and read/write control signal;
   predecoder means for receiving memory requests and outputting said memory requests along with information regarding said memory requests to a means for controlling said first and second means for outputting;
   said means for controlling said first and second means for outputting, receiving said memory requests and outputting control signals which control said first and second means for outputting such that said means for controlling determines the order in which said memory requests are granted, using said information output by said predecoder means to output memory requests in said first memory request stream at times independent of the timing of requests in said second memory request stream.

27. Apparatus as claimed in claim 26 wherein a plurality of said received memory requests are received in a first order and wherein said means for controlling controls said first and second means for outputting such that requests in said first and second memory streams are provided to a memory in an order different from said first order.

28. Apparatus as claimed in claim 26 further comprising means for performing coherency checking procedures for requests in a first portion of said address space in the absence of performing said coherency checking procedures for requests in a second portion of said address space.

29. Apparatus, as claimed in claim 26, further comprising:

means for storing data from write requests, prior to writing said data, and means for outputting data from said means for storing, in response to a read request for an address matching a write address for data stored in said means for storing.

* * * * *